F. HOUSEHOLDER.
WHEEL TIRE.
APPLICATION FILED APR. 17, 1911.
1,044,888.
Patented Nov. 19, 1912.
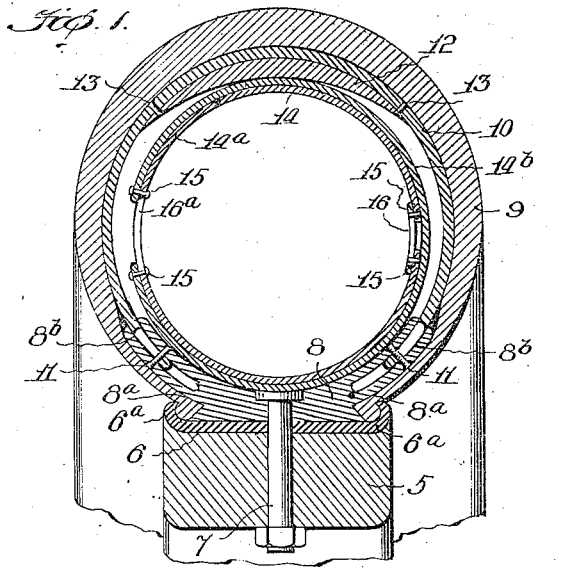
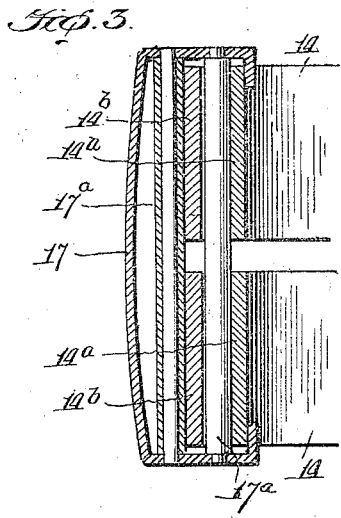
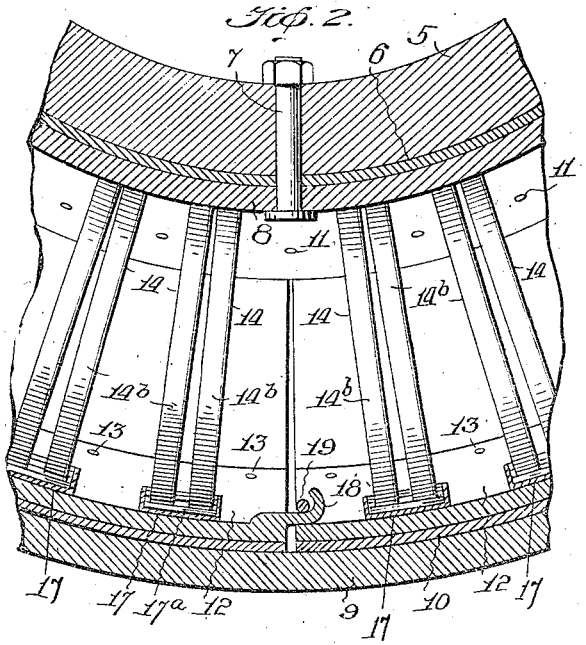
Witnesses
Inventor
Frank Householder,
By
Attorney

UNITED STATES PATENT OFFICE.

FRANK HOUSEHOLDER, OF GUTHRIE, OKLAHOMA.

WHEEL-TIRE.

1,044,888.

Specification of Letters Patent. Patented Nov. 19, 1912.

Application filed April 17, 1911. Serial No. 621,550.

*To all whom it may concern:*

Be it known that I, FRANK HOUSEHOLDER, a citizen of the United States, residing at Guthrie, in the county of Logan and State of Oklahoma, have invented a Wheel-Tire, of which the following is a specification.

My invention is an improvement in wheel tires, and relates more especially to rubber tires of that particular class in which the tire or tube is maintained inflated so as to provide a resilient body and tread, possessing distinct advantages over a solid tire. In the operation of tires of this character it is customary to maintain them inflated by means of compressed air confined within the outer tube or casing itself or within a supplemental inner tube; but this form of tire is objectionable to the extent that it is liable to puncture and become deflated, thus destroying its resiliency.

The primary object of my present invention is to provide a particular form of resilient tire in which the outer tube or casing is maintained in a distended condition by means of metal springs disposed around the inner side of the tire or tube in such manner as to give the required resiliency to the tread without danger of deflation, consequently producing a more durable tire.

A further object of my invention is to provide the necessary resiliency by means of a tube distended by springs and attached to the felly of the wheel and over which the outer casing or shoe is applied, so that the latter may be renewed when worn without removing said distended inner tube.

Other objects and advantages of the invention will hereinafter appear, and what I claim as new and desire to secure by Letters-Patent is more specifically set forth in the appended claims.

In the accompanying drawings, which form a part of this specification:—Figure 1 is a transverse sectional view through a wheel tire, constructed in accordance with my invention. Fig. 2 is a longitudinal sectional view through a portion of the tire, and showing the application of bearing cages for the hoop springs. Fig. 3 is a detail view, in section, showing a pair of springs and the means employed for supporting them within the tire.

Like numerals of reference indicate like parts in all the figures of the drawings.

Referring to the drawings, 5 designates the felly of a wheel, and 6 the metal rim which is attached to the felly by means of bolts 7, said rim being preferably turned up at its edges, as at $6^a$, to clench and hold the tire in place, as hereinafter described.

In carrying out my invention I provide a supplemental rim 8, of metal, which may be and preferably is bolted to the felly by the bolts 7 which pass through the rim 6, said supplemental rim being recessed at its sides, as at $8^a$, to coöperate with the upturned edges $6^a$ in holding in place the outer casing or shoe 9. The inner side of the supplemental rim 8 is curved transversely, and the outer edges of the side portions thereof are recessed or grooved, as at $8^b$, to receive a casing 10, preferably steel, said casing in connection with the supplemental rim forming an inner tube over which the outer tube or casing is placed. The steel casing is secured to the supplemental rim by letting the edges of said casing seat in the grooves $8^b$, and securing them in place by screw bolts 11, which pass through slots in the casing.

The inner tube or casing 10 is provided at the inner side of the outer portion or tread with a metal reinforcing strip 12, tapered at its opposite edges and attached to the steel casing by means of rivets 13. The inner tube or casing 10 is maintained inflated or distended by means of springs, and in Figs. 1, 2 and 3, I have shown hoop springs 14 for the purpose, each composed of two sections or split-rings $14^a$ and $14^b$, one within the other and breaking joint at opposite sides of the hoop, the ends of the springs being normally separated, as shown in Fig. 1, so as to permit the required spring movement, as the sections slide upon each other under compression. The split-rings forming the hoop-spring are connected together by rivets 15, which pass through the ends of one ring and through a slot $15^a$ in the other ring, the ends of the inner ring being preferably connected by a slotted plate 16, as shown in Fig. 1. For the purpose of holding the hoop springs in proper position within the inner tube or casing of the tire and to reduce friction, said springs are arranged in pairs as shown in Figs. 2 and 3, and those of each pair connected by metal strips or cages 17, secured to the reinforcing piece 12 and carrying anti-friction rollers 17ª, against which the rings bear, respectively. The inner tube or casing 10 is made of one piece split transversely the ends of which are connected together by forming a lip or hook 18 on one end which engages with a cross-piece or bolt 19 on the adjoining end, the lip or hook being preferably a continuation of the reinforcing piece 12, the connection being such as to permit of a slight play between the ends, as indicated in Fig. 2.

In the application of my improved tire the supplemental rim 8 and parts carried thereby are securely attached to the rim of the wheel, by bolts passing through said supplemental rim, and the shoe or outer casing 9 is then stretched over the inner casing 10 and supplemental rim 8 so that the edges of the shoe will take into the recesses 8ª and will be held in place by the upturned edges 6ª of the wheel-rim 6. This rim 6 may be in two sections, one being adjustable so as to tightly draw and clamp the outer casing or shoe in place.

In use the tire will be depressed in practically the same manner as an ordinary pneumatic tire, the degree of resiliency depending, of course, upon the strength or yieldable quality of the springs, and as there will be little or practically no wear on the inner tube and springs and no danger of deflation on account of puncture the life of a tire constructed in this manner will be very long, depending entirely on the wearing quality of the shoe.

Having thus described my invention, what I claim as new and desire to secure by Letters-Patent, is:—

1. In a wheel-tire, the combination, of a supplemental rim secured to the wheel, a tubular casing attached to the supplemental rim, and hoop springs disposed within the casing, each spring comprising split rings connected together and breaking joint at different places, and a shoe or outer casing around the aforesaid casing, substantially as shown and described.

2. In a wheel-tire, the combination, of a supplemental rim secured to the wheel, a tubular casing attached to the supplemental rim, hoop springs disposed within the casing and comprising two split rings connected together for movement one upon the other, and a metal strip or cage connecting two of the hoop springs together, substantially as shown and described.

3. A hoop spring for wheel-tires, comprising split rings located one within the other and breaking joint, one ring having a slot, and means, as rivets, or connecting the split rings together, said rivets passing through the slot in one ring and the adjoining ends of the other ring, substantially as shown and described.

In testimony whereof I have signed my name to this specification in the presence of two subscribing witnesses.

FRANK HOUSEHOLDER.

Witnesses:
J. C. WHITEFIELD,
E. J. MURPHY.